United States Patent [19]
Jablonski

[11] 4,405,758
[45] Sep. 20, 1983

[54] VULCANIZABLE ACRYLATE RUBBER COMPOSITIONS

[75] Inventor: Dane E. Jablonski, Brunswick, Ohio

[73] Assignee: The B. F. Goodrich Company, Akron, Ohio

[21] Appl. No.: 379,215

[22] Filed: May 17, 1982

[51] Int. Cl.³ ............................................. C08F 8/34
[52] U.S. Cl. .............................. 525/329.8; 525/328.2; 525/328.5; 525/328.6; 525/328.9; 525/329.2; 525/329.5; 525/346
[58] Field of Search ............... 525/329.5, 329.8, 328.5, 525/329.2, 328.2, 328.6, 328.9

[56] References Cited

U.S. PATENT DOCUMENTS 3,875,092  4/1975  Morris ........................ 525/329.7
3,910,866 10/1975  Morris ........................ 525/329.5

Primary Examiner—Stanford M. Levin
Attorney, Agent, or Firm—J. Hughes Powell, Jr.

[57] ABSTRACT

Dual cure site acrylate rubbers having both carboxyl and active halogen groups are compounded with a combination of sodium stearate and a tetramethyl thiuram disulfide or a Group IB, IIB, IVA, VA, and VIA metal compound thereof to provide compounded acrylate rubbers having an excellent scorch/cure rate balance and desirable physical properties in the vulcanizates thereof.

8 Claims, No Drawings

VULCANIZABLE ACRYLATE RUBBER COMPOSITIONS

BACKGROUND OF THE INVENTION

U.S. Pat. No. 3,910,866 describes the vulcanization of acrylate rubbers and elastomers that contain both halogen and carboxyl cure sites with a combination of an alkali metal oxy compound and a quaternary ammonium salt, a tertiary amine or a guanidine. The cure of such dual cure site acrylate elastomers with a quaternary ammonium salt is disclosed in U.S. Pat. No. 3,875,092. While these and other cure systems have been used to cure halogen and carboxyl containing acrylate elastomers, improved vulcanization systems are desired that will provide improved physical properties in the vulcanizates as well as a better scorch/cure rate balance.

SUMMARY OF THE INVENTION

Acrylate rubber compositions containing both halogen and carboxyl cure sites having an improved scorch/cure rate balance, and a good physical property balance in the resulting vulcanizates, are obtained when the acrylate rubbers are compounded with a combination of sodium stearate and tetramethyl thiuram disulfide or Group IB, IIB, IVA, VA or VIA metal salts thereof.

DETAILED DESCRIPTION

The acrylate rubbers are interpolymers comprising at least one acrylic acid ester monomer, a reactive halogen-containing monomer, and a carboxyl-containing monomer.

The acrylate rubbers contain from about 40% to about 98% by weight, based upon the weight of the polymer, of an acrylic ester of the formula

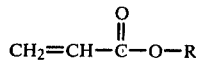

wherein R is an alkyl radical containing 1 to 18 carbon atoms, an alkoxyalkyl or alkylthioalkyl radical containing a total of 2 to about 12 carbon atoms, or a cyanoalkyl radical containing 2 to about 12 carbon atoms. The alkyl structure can be primary, secondary, or tertiary. Examples of such acrylates are methyl acrylate, ethyl acrylate, propyl acrylate, n-butyl acrylate, isobutyl acrylate, n-pentyl acrylate, isoamyl acrylate, n-hexyl acrylate, 2-methyl-pentyl acrylate, n-octyl acrylate, 2-ethylhexyl acrylate, n-decyl acrylate, n-dodecyl acrylate, n-octadecyl acrylate, and the like; methoxymethyl acrylate, methoxyethyl acrylate, ethoxyethyl acrylate, butoxyethyl acrylate, ethoxypropyl acrylate; methylthioethylacrylate, hexylthioethylacrylate, and the like; and α and β-cyanoethyl acrylate, α, β and γ-cyanopropyl acrylate, cyanobutyl acrylate, cyanohexyl acrylate, cyanooctyl acrylate, and the like. Mixtures of two or more monomers and/or types of acrylate monomers are employed.

Preferredly, the rubbers contain from about 65% to about 98% by weight of acrylates of the formula wherein R is an alkyl radical containing 1 to about 10 carbon atoms or an alkoxyalkyl radical containing 2 to about 8 carbon atoms. Examples of the more preferred acrylates are ethyl acrylate, propyl acrylate, n-butyl acrylate, hexyl acrylate, 2-ethylhexyl acrylate, octyl acrylate, and the like; and methoxyethyl acrylate, ethoxyethyl acrylate, and the like. Both an alkyl acrylate and an alkoxyalkyl acrylate can be used.

The rubbers contain from about 0.1% to about 30% by weight of an active halogen-containing monomer. The halogen groups can be chlorine, bromine or iodine. These monomers are generally (1) halogen-containing vinylene hydrocarbons or (2) halogen-containing vinyl monomers having the halogen group at least two carbon atoms removed from an oxygen atom(s). Examples of (1) are vinyl benzyl chloride, vinyl benzyl bromide, 2-chloromethyl-5-norbornene, 2-bromoethyl-5-norbornene, 2-chloroethyl-5-norbornene, and the like; (2) are characterized by having ether (—O—), ketone

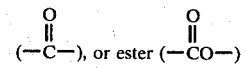

structures in the monomer where the halogen group is at least 2 carbon atoms and up to 6 or more carbon atoms removed from an oxygen atom. Examples of these monomers are halogen-containing vinyl esters such as vinyl chloroacetate, cyclol chloroacetate, vinyl bromoacetate, allyl chloroacetate, vinyl 3-chloropropionate, vinyl 4-chlorobutyrate, vinyl 4-bromobutyrate, and the like; halogen-containing acrylates such as 2-chloroethyl acrylate, 3-chloropropyl acrylate, 4-chlorobutyl acrylate, 2-chloroethyl methacrylate, 2-bromoethyl acrylate, 2-iodoethyl acrylate, 4-chloro-2-butenyl acrylate, 2-chloroacetoxyethyl acrylate and methacrylate, and the like; halogen-containing vinyl ethers such as 2-chloroethyl vinyl ether; halogen-containing vinyl ketones such as chloromethyl vinyl ketone, 2-chloroethyl vinyl ketone, and the like; and 2-chloroacetoxymethyl-5-norbornene, 2-(α,β-dichloropropionylmethyl)-5-norbornene, and the like.

More preferably, the rubber contains from about 0.2% to about 15% by weight of the active halogen-containing monomer. At this level, the halogen content is from about 0.1% to about 5% by weight of the rubber. Due to availability and cost, the chlorine-containing monomers are preferred. Examples of the more preferred monomers are vinyl chloroacetate, allyl chloroacetate, 2-chloroethyl acrylate, 2-chloroethyl vinyl ether, 3-chloropropyl acrylate, cyclol chloroacetate, chloromethyl vinyl ketone, vinyl benzyl chloride, 2-chloromethyl-5-norbornene, 2-chloroacetoxyethyl acrylate and methacrylate, and 2-chloroacetoxymethyl-5-norbornene.

The rubbers also contain from about 0.1% to about 20% by weight of an unsaturated carboxyl-containing monomer. The monomer can be monocarboxylic or poly-carboxylic, containing from 3 to about 8 carbon atoms. Examples of such monomers are acrylic acid, methacrylic acid, ethacrylic acid, β,β-dimethyl acrylic acid, crotonic acid, 2-pentenoic acid, 2-hexenoic acid, maleic acid, fumaric acid, citraconic acid, mesaconic acid, itaconic acid, 3-butene-1,2,3-tricarboxylic acid, and the like.

More preferably, the rubber contains from about 0.2% to about 10% by weight of the carboxyl-containing monomer. At this level, the carboxyl content is from about 0.1% to about 7% by weight of the rubber. The more preferred monomers are the monocarboxylic acid monomers such as acrylic acid, methacrylic acid, itaconic acid, and the like.

The rubber can contain up to about 35% and preferably up to about 10% by weight of other copolymerizable vinylidene monomers having a terminal vinylidene ($CH_2<$) group. Examples of such are phenyl acrylate, cyclohexyl acrylate, methacrylates such as methyl methacrylate, ethyl methacrylate, octyl methacrylate, and the like; vinyl and allyl esters such as vinyl acetate, vinyl propionate, allyl acetate, and the like; alkyl vinyl ketones such as methyl vinyl ketone; vinyl and allyl ethers such as vinyl methyl ether, vinyl ethyl ether, allyl methyl ether, and the like; vinyl aromatics such as styrene, α-methyl styrene, chlorostyrene, vinyl toluene, and the like; vinyl chloride, vinylidene chloride; alkyl fumarates, vinyl nitriles such as acrylonitrile and methacrylonitrile; vinyl amides such as acrylamide, methacrylamide, N-methylol acrylamide, and the like; and dienes and divinyls such as butadiene, isoprene, divinyl benzene, divinyl ether, diethylene glycol diacrylate, glycidyl acrylate and methacrylate, and the like. The more preferred copolymerizable monomers are vinyl acetate, methyl methacrylate, ethyl methacrylate, styrene, acrylonitrile, acrylamide, and diethylene glycol diacrylate.

The acrylate rubbers can be prepared using emulsion, suspension, solution, and bulk techniques known to those skilled in the art. It is convenient to polymerize the monomers to 90 percent conversion or more by emulsion and suspension techniques. The polymerization can be performed as a batch reaction, continuous, or one or more ingredients can be proportioned during the run. Temperature of polymerization ranges from about $-10°$ C. to about 100° C., whereas a more preferred range is from about 5° C. to about 80° C.

The polymerization can be initiated by free-radical generating agents. Examples of such agents are inorganic peroxides and organic peroxides and hydroperoxides such as benzoyl peroxide, dicumyl peroxide, cumene hydroperoxide, paramenthane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photosensitive agents such as benzophenone, triphenylphosphine, organic diazos, and the like.

Typical emulsion polymerization ingredients would include a persulfate salt or organic peroxide and usually a redox system, water adjusted to a desired pH with acids or bases and usually buffered with inorganic salts, and either anionic, cationic, or nonionic surface active agents well known to the art, including alkali alkyl sulfonates, aralkyl sulfonates and polyglycol fatty acids.

The polymerization normally is continued until about 95% conversion of monomers is obtained. The resulting latex can be coagulated to isolate the polymer. Typical coagulation procedures are salt/acid coagulations, use of polyvalent metal salts such as $MgSO_4$, use of alcohols such as methanol and isopropyl alcohol, spray drying and freeze agglomeration techniques. The rubber is usually washed with water and dried.

The acrylate rubbers are solid elastomers usually having a dilute solution viscosity (DSV) of over 0.5 as measured on 0.2 gram of rubber in 100 ml. benzene at 25° C. Raw polymer Mooney values (ML-4, at 212° F.) are from about 20 to about 125.

The rubbers are admixed with cure ingredients and the usual compounding ingredients using two-roll mills, internal mixers such as Banburys and extruders, and like equipment.

The novel cure system of this invention requires sodium stearate and tetramethyl thiuram disulfide or a Group IB, IIB, IVA, VA, or VIA (of the Periodic Chart) metal compound thereof. The nature of the alkyl substitution at the nitrogen atom of the thiuram component is critical to cure acceleration activity. Methyl groups yield the best activity, as compared to ethyl and butyl. The metal salts of these tetraalkyl thiuram disulfides show this same variation in activity, the methyl-compound showing unexpected superiority over the other metal thiuram compounds as used in this system.

The metal compound contains a metal of Groups IB, IIB, IVA, VA, and VIA of the Periodic Chart of the elements. Typical salts include copper tetramethyl thiuram disulfide, zinc tetramethyl thiuram disulfide, lead tetramethyl thiuram disulfide, bismuth tetramethyl thiuram disulfide, tellurium tetramethyl thiuram disulfide, tin tetramethyl thiuram disulfide and the like.

The amounts and ratios of sodium stearate and of tetramethyl thiuram disulfide may be varied widely to obtain a variety of properties. A particularly useful range is from about 1 to about 10 weight part of sodium stearate, about 0.1 to about 5 weight parts, i.e. 0.2 to 2, of the tetramethyl thiuram disulfide per 100 weight parts of acrylate rubber. Excellent results have been obtained with about 2 to 5 weight parts of sodium stearate and about 0.5 to 2 weight parts of tetramethyl thiuram disulfide or the equivalent molar amount of the metal salts thereof.

The acrylate rubbers can be admixed with many other rubber compounding ingredients. Examples of such ingredients are fillers such as the carbon blacks, silica, aluminum silicates, phenol-formaldehyde and polystyrene resins, asbestos, and the like; plasticizers and extenders such as dialkyl and diaryl organic esters like diisobutyl, diisooctyl, and dibenzyl sebacates, azelates, phthalates, and the like; petroleum oils, castor oil, tall oil, glycerin, and the like; antioxidants and stabilizers such as phenyl-B-naphthylamine, 2,6-di-t-butyl paracresol, 2,2'-methylenebis(4-ethyl-6-t-butyl phenol), 2,2'-thiobis(4-methyl-6-t-butyl phenol), 4,4'-butylidenebis-(6-t-butyl-m-cresol), tris-(3,5-di-t-butyl-4-hydroxybenzyl) isocyanurate, tetrakis-methylene-3(3',5'-di-t-butyl-4'-hydroxyphenyl) propionate methane, distearyl thiodipropionate, tri(nonylatedphenyl) phosphite, and the like; and other ingredients such as processing aids, pigments, tackifiers, flame retardants, fungicides, and the like.

The novel compositions are cured at temperatures from about 250° F. to about 450° F., whereas a more preferred range is from about 275° F. to about 400° F. Cure times vary inversely as temperature, and range from about 1 minute to about 60 minutes or more.

The vulcanizates were evaluated as to their compression set (ASTM D395), tensile and elongation (ASTM D412), and hardness (ASTM D2240-durometer A). Cure times were determined using a Mooney Viscometer (ASTM D1646) with a large rotor, or using a Monsanto Rheometer (ASTM D2084). The samples were press cured and then oven cured.

The following examples serve to more fully illustrate the practice of the invention.

EXAMPLE I

The acrylate rubber of this example contained 98 weight percent ethyl acrylate, 1.6 weight percent vinyl benzyl chloride and 0.4 weight percent methacrylic acid. The rubber had a Mooney value of 50 ML. A masterbatch containing the rubber, processing aid, stearic acid and carbon black was prepared in an internal mixer. The curing agents used, and the amounts, are shown in the Table. Tetramethyl thiuram disulfide (TMTD), tetrabutyl thiuram disulfide (TBTD), zinc tetraethyl thiuram disulfide (ZnTETD), lead tetramethyl thiuram disulfide (PbTMTD), and zinc tetramethyl thiuram disulfide (ZnTMTD) were added to masterbatch portions with sodium stearate and the compounds tested and cured as shown in Table I.

TABLE I

| Compound | 1 | 2 | 3 | 4 | 5 |
|---|---|---|---|---|---|
| Acrylate Rubber | 100 | 100 | 100 | 100 | 100 |
| Processing Aid* | 2 | 2 | 2 | 2 | 2 |
| Stearic Acid | 1 | 1 | 1 | 1 | 1 |
| Philblack N-550** | 65 | 65 | 65 | 65 | 65 |
| Sodium Stearate | 4.0 | 4.0 | 4.0 | 4.0 | 4.0 |
| TMTD | 0.75 | — | — | — | — |
| TBTD | — | 1.25 | — | — | — |
| ZnTETD | — | — | 1.25 | — | — |
| PbTMTD | — | — | — | 1.5 | — |
| ZnTMTD | — | — | — | — | 1.0 |
| Mooney Viscometer (125° C., Large Rotor) | | | | | |
| Minimum | 45 | 40 | 49 | 49 | 54 |
| $T_5$, minutes | 12.9 | >30 | >30 | >30 | 6.2 |
| $T_{35}$, minutes | 26.1 | >>30 | >>30 | >>30 | 28.6 |
| Rheometer (30', 190° C., Micro Die) | | | | | |
| $M_L$, (in-lb) | 5.4 | 4.8 | 6.2 | 6.2 | 5.8 |
| $M_H$, (in-lb) | 24.5 | 15.0 | 15.3 | 23.5 | 16.5 |
| $M\Delta$, (in-lb) | 19.1 | 10.2 | 9.1 | 17.3 | 10.7 |
| $t_1$, minutes | 1.8 | 2.0 | 2.2 | 1.3 | 1.5 |
| $t'_{90}$, minutes | 17.0 | — | — | 20.5 | 20.0 |
| Press Cure (4', 190° C.) | | | | | |
| Modulus 100% psi | 550 | 240 | 270 | 550 | 550 |
| Tensile, psi | 1650 | 520 | 530 | 1680 | 1570 |
| Elongation, % | 320 | 860 | 900 | 300 | 300 |
| Hardness-A | 76 | 75 | 74 | 77 | 73 |
| % C.S. (70 hr/150° C.) | | | | | |
| 8' Button | 72 | 98 | 101 | 83 | 79 |
| Post Cure (4 hr., 175° C.) | | | | | |
| Modulus 100%, psi | 1280 | 750 | 780 | 1280 | 900 |
| Tensile, psi | 2150 | 1950 | 1880 | 2030 | 1900 |
| Elongation, % | 150 | 230 | 240 | 140 | 170 |
| Hardness-A | 80 | 80 | 80 | 78 | 76 |
| % C.S. (70 hr/150° C.) | | | | | |
| 8' Button | 27 | 62 | 66 | 30 | 43 |

*Zinc stearate, fatty acid processing aid.
**Furnace Black

As compared to tetramethyl thiuram disulfide, tetrabutyl thiuram disulfide and the zinc salt of tetraethyl thiuram disulfide had inferior cure activity. The zinc teteraethyl thiuram disulfide also had inferior activity as compared to the zinc salt of tetramethyl thiuram disulfide, thus demonstrating the criticality of the thiuram alkyl in this sodium stearate cure system for the dual carboxyl-halogen cure site acrylate ester elastomers. The lead compound of tetramethyl thiuram disulfide also demonstrated good scorch safety and an excellent balance of desired physical properties. Runs 1 and 4 had an excellent balance of physical properties. Particularly noteworthy is the desirable low compression set which results when the vulcanizates are cured for short cycle, high temperature cures with tetramethyl thiuram sulfide, as compared to other thiuram derivatives when used in accordance with this invention.

EXAMPLE II

This Example demonstrates the unexpected advantages of using tetramethyl thiuram disulfide with sodium stearate in curing a dual cure site acrylate elastomer, as compared to a known curing agent cyclic sulfur ($S_8$). Each compound was prepared with 100 weight parts of the elastomer of Example I, 2 parts of processing aid, 75 parts of high abrasion furnace black, 1 part of stearic acid and 4.0 parts of sodium stearate. In run (1) 0.4 weight part of cyclic sulfur was used and in the other run (2) 0.75 weight part of tetramethyl thiuram disulfide was used. The results obtained are set forth in Table II and demonstrate the unexpectedly good results obtained with (2) as compared to (1).

TABLE II

| Compound | 1 | 2 |
|---|---|---|
| Mooney Viscometer (125° C., Large Rotor) | | |
| Minimum | 51 | 47 |
| $T_5$, minutes | 27.0 | 9.4 |
| $T_{35}$, minutes | >30 | 22.6 |
| Rheometer (60', 170° C., Micro Die) | | |
| $M_L$, (in-lb) | 6.7 | 5.8 |
| $M_H$, (in-lb) | 28.5 | 22.5 |
| $M\Delta$, (in-lb) | 21.8 | 16.7 |
| $t_1$, minutes | 2.2 | 1.8 |
| $t'_{90}$, minutes | 38.0 | *16.0 |
| Press Cure (4', 190° C.) | | |
| Modulus 100% psi | 350 | 580 |
| Tensile, psi | 1020 | *1620 |
| Elongation, % | 490 | 270 |
| Hardness-A | 74 | 76 |
| Post Cure (4 hr., 175° C.) | | |
| Modulus 100%, psi | 1350 | 1150 |
| Tensile, psi | 2020 | 2030 |
| Elongation, % | 160 | 180 |
| Hardness-A | 81 | 78 |
| % C.S. (70 hr/150° C.) | | |
| 8' Button | 54 | *30 |

*Significant improvements
To be noted particularly are the $t'_{90}$ values, the higher press cure tensile and lower % of elongations showing a better state of cure, and the great improvement in compression set of the materials cured with the tetramethyl thiuram disulfide as compared to the use of sulfur.

The curing combination of this invention provides compositions with varying scorch/cure balances, and a broad range of physical properties, thus providing latitude for a wide range of applications. The vulcanized acrylate rubbers are used in many applications where weatherability, high temperature resistance and oil resistance are required. Such applications include under the hood automobile parts, including gaskets, seals, packing, belting and hose; outdoor applications such as weather stripping, sealants and hose; oil field applications in seals, gaskets and the like.

I claim:

1. A composition comprising (1) an acrylate rubber containing (a) from about 40 percent to about 98 percent by weight of an acrylate of the formula

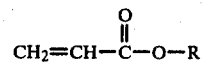

wherein R is selected from the group consisting of an alkyl radical containing 1 to 18 carbon atoms, an alkoxyalkyl, an alkylthioalkyl, and a cyanoalkyl radical containing 2 to about 12 carbon atoms, (b) from about 0.1 percent to about 30 percent by weight of a halogen-containing monomer selected from the group consisting of halogen-containing vinylene hydrocarbons and halogen-containing vinyl monomers having the halogen group at least two carbon atoms removed from an oxygen atom, (c) from about 0.1 percent to about 20 percent by weight of an unsaturated carboxyl-containing monomer, containing 3 to about 8 carbon atoms, and (d) 0 to 35 percent by weight of a copolymerizable monomer containing a terminal vinylidene group, and (2) as the curative, vulcanizing amounts of sodium stearate and tetramethyl thiuram disulfide or a Group IB, IIB, IVA, or VIA metal salt thereof.

2. A composition of claim 1 wherein (1) is an acrylate rubber of (a) from about 65 percent to about 98 percent by weight of an acrylate wherein R is selected from the group consisting of alkyl radicals containing 1 to about 10 carbon atoms and alkoxyalkyl radicals containing 2 to about 8 carbon atoms, (b) from about 0.2 percent to about 15 percent by weight of a halogen-containing monomer, (c) from about 0.2 percent to about 10 percent by weight of a carboxyl-containing monomer, and (d) up to about 10 percent by weight of a copolymerizable monomer containing a terminal vinylidene group and about 1 to about 6 weight parts of sodium stearate and 0.25 to 2 weight parts of tetramethyl thiuram disulfide, all weights based on 100 parts of acrylate rubber.

3. A composition of claim 2 wherein (a) is an acrylate selected from the group consisting of ethyl acrylate, n-butyl acrylate, methoxyethyl acrylate and ethoxyethyl acrylate, (b) is selected from the group consisting of vinyl chloroacetate, allyl chloroacetate, 2-chloroethyl acrylate, 2-chloroethyl vinyl ether, vinyl benzyl chloride, 2-chloromethyl-5-norbornene, and 2-chloroacetoxymethyl-5-norbornene, (c) is selected from the group consisting of acrylic acid, methacrylic acid, and itaconic acid, containing about 2 to 5 weight parts of said sodium stearate, about 0.5 to 1 weight part of tetramethyl thiuram disulfide or molar equivalents of Group IB, IIB, IVA, VA or VIA salts thereof.

4. A composition of claim 3 wherein the metal is selected from the group consisting of copper, zinc and lead.

5. A composition of claim 3 wherein (a) comprises ethyl acrylate or butyl acrylate, (b) is vinyl benzyl chloride in amount of about 1 to 2 weight percent, (c) is acrylic or methacrylic acid in amount of about 0.1 to 1.0 weight percent and there is present about 3 to 5 weight parts of sodium stearate about 0.5 to 2 weight parts of tetramethyl thiuram disulfide.

6. A composition of claim 5 wherein the disulfide is zinc tetramethyl thiuram disulfide.

7. A composition of claim 5 wherein the disulfide is lead tetramethyl thiuram disulfide.

8. A composition of claim 5 wherein (d) is selected from the group consisting of an alkylmethacrylate, a styrene, a vinyl nitrile and an acrylamide.

* * * * *